Oct. 1, 1929.   M. J. REES   1,729,685
ELECTRIC WATER HEATER AND STEAM GENERATOR
Filed April 14, 1928
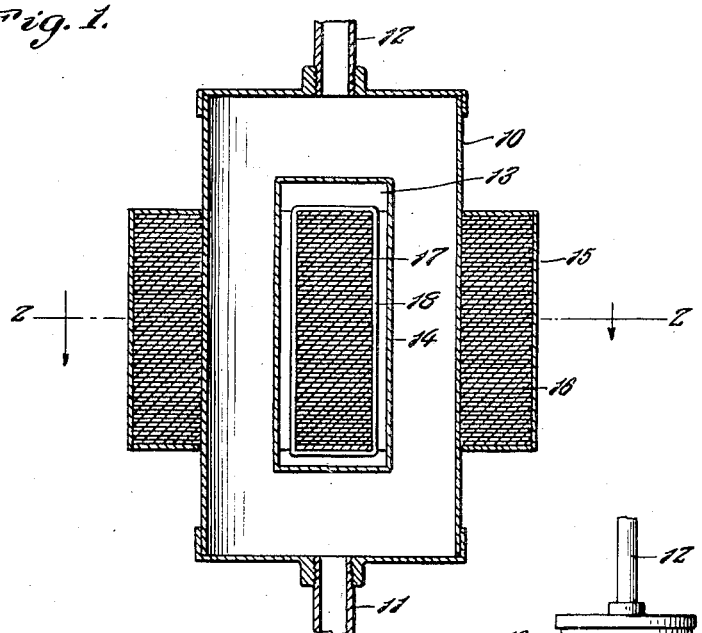
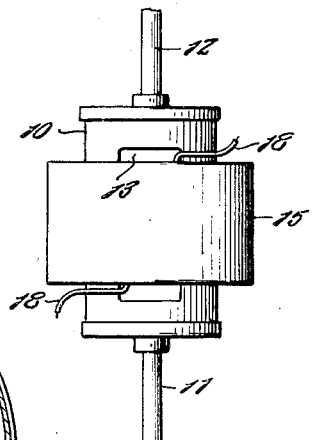
M.J.Rees
INVENTOR
BY Victor J. Evans
ATTORNEY Patented Oct. 1, 1929

1,729,685

UNITED STATES PATENT OFFICE

MILLARD J. REES, OF LINCOLN, KANSAS, ASSIGNOR OF ONE-HALF TO HENRY D. GRAVES, OF LINCOLN, KANSAS

ELECTRIC WATER HEATER AND STEAM GENERATOR

Application filed April 14, 1928. Serial No. 270,039.

The present invention relates to an electric water heater and steam generator and has for its object to improve the construction and efficiency of heaters of this character.

Other objects and advantages will appear from the following specification and will be included in the appended claims.

In the drawings:—

Figure 1 is a vertical section through the center of my heating apparatus which forms the subject matter of the present invention.

Figure 2 is a transverse section on line 2—2 of Figure 1 looking in the direction of the arrows.

Figure 3 is a front view of the apparatus.

Referring to the drawings in detail by reference numerals, the same designating the same parts in all figures of the drawings, 10 designates a cylindrical tank for heating water and for converting it into steam and to the ends of which are connected the supply pipe 11 and the outlet pipe 12 of a water system. The tank is provided with an oblong passage 13 formed centrally therethrough, with the walls 14 thereof connected with the side walls $10^a$ of the tank.

Surrounding the tank is a casing 15 containing therein a plurality of metallic ring like plates 16, said plates and said casing being annular in configuration and the plates being provided with diametrically located portions or strips 17 extending through the passage 13 of the tank, said portions being connected at their opposite ends to the plates 16. The plates are preferably made of transformer iron and the transverse portions 17 thereof have wound thereabout a winding 18 of electrically conductive material such as copper wire, the ends of which are connected with a suitable source of electricity not shown in the drawings as it constitutes no part of the present invention, but preferably providing an alternating current to the windings. The plates 16, portions 17 and windings 18 provide what is known as a transformer with but one winding, the latter being known as or called a primary winding, the plates constituting the equivalent of a secondary winding. The combination of the plates and the windings constituting heating elements of the transformer type, the plates being preferably made of transformer iron and the primary winding being connected to the source of electricity having, say one hundred volts. A device made in accordance with the above construction constitutes an extremely effective heating apparatus.

Having described my invention what I claim is:—

1. A water heater comprising a cylindrical tank having an oblong passage formed centrally therethrough, an inlet pipe in communication with the bottom of the tank, an outlet pipe in communication with the top of the tank, a casing surrounding the tank, annular superposed transformer iron ring like plates arranged in the casing and surrounding the tank intermediate its ends, strips formed with said plates and extending diametrically across the same, said strips being arranged through the passage and disposed in spaced relation with the walls thereof, and windings of copper wire about the strips and being in electrical connection with a source of electric energy.

2. An electric heating unit for tanks comprising a casing, transformer iron ring like plates arranged in superposed relation in said casing, strips formed with each of the plates and extending diametrically across the same to provide spaces between the sides thereof and the plates respectively to accommodate a water tank, windings about the strips and being in electrical connection with a source of electric energy.

3. A water tank formed to receive and support an electric heating unit and being of cylindrical formation, an inlet pipe in communication with the bottom of said tank, an outlet pipe in communication with the top of said tank, and said tank being provided with an oblong passage extending centrally therethrough with the walls of the passage being formed with the rounded walls of the tank.

In testimony whereof I affix my signature.

MILLARD J. REES.